United States Patent [19]

Meier et al.

[11] Patent Number: 4,968,910
[45] Date of Patent: Nov. 6, 1990

[54] AXIAL SECURING DEVICE FOR THE SHAFT OF A SMALL MOTOR

[75] Inventors: Peter Meier, Lindau; Ernst Scherrer, Greifensee, both of Switzerland

[73] Assignee: Micronel AG, Switzerland

[21] Appl. No.: 401,424

[22] Filed: Aug. 31, 1989

[51] Int. Cl.$^5$ .......................................... H02K 15/00
[52] U.S. Cl. ......................................... 310/42; 310/90; 310/258; 384/539; 384/903; 403/326
[58] Field of Search ............ 310/90, 91, 40 MM, 157, 310/89, 42, 258, 179, 261; 403/226, 326; 184/903, 539, 217; 29/596

[56] References Cited

U.S. PATENT DOCUMENTS

| | | | |
|---|---|---|---|
| 2,454,314 | 7/1969 | Sanguinetti | 384/539 |
| 2,487,803 | 11/1949 | Heimann | 384/903 |
| 2,928,960 | 3/1960 | Macks | 310/90 |
| 4,128,778 | 12/1978 | Merkle | 310/90 |
| 4,174,484 | 11/1979 | Schmider | 310/90 |
| 4,354,808 | 10/1982 | Ilg | 403/326 |
| 4,364,615 | 12/1982 | Euler | 384/539 |
| 4,612,468 | 9/1986 | Sturm | 310/90 |
| 4,767,073 | 8/1988 | Föhl | 384/539 |
| 4,783,608 | 11/1988 | Gruber | 310/90 |
| 4,733,9897 | 3/1988 | Tomlinson | 403/326 |

FOREIGN PATENT DOCUMENTS

| | | |
|---|---|---|
| 2601197 | 7/1976 | Fed. Rep. of Germany . |
| 2718428 | 10/1977 | Fed. Rep. of Germany ... 310/90 UX |
| 2253940 | 7/1975 | France . |
| 6172076 | 5/1986 | Japan . |
| 2152294 | 7/1985 | United Kingdom . |

*Primary Examiner*—R. Skudy
*Attorney, Agent, or Firm*—Webb, Burden, Ziesenheim & Webb

[57] ABSTRACT

An axial securing device for the shaft of a small motor in which one end of the shaft is solidly connected with a rotor and the other end is supported in a thrust bearing of a stator. A securing element is locked into an annular groove of the shaft. The securing element has an inwardly directed bulge and a cylindrical projection. When the shaft is inserted, the securing element is pushed in front of the annular groove during the radial extension and locks into the annular groove by itself during further axial movement. The projection is so dimensioned so that through this movement its underside surrounds the contact surface of the shaft end.

8 Claims, 1 Drawing Sheet

4,968,910

AXIAL SECURING DEVICE FOR THE SHAFT OF A SMALL MOTOR

BACKGROUND OF THE INVENTION

1. Field of the Invention

This invention relates to an axial securing device and more particularly to a device for axially securing the shaft of a small motor wherein one end of the shaft is connected solidly with a rotor of the motor, the other end is supported by a thrust bearing of the stator and the securing element is snapped into an annular groove of the shaft for axially securing the shaft and which is located in a recess of the stator. According to the invention, the securing element and the recess have contact surfaces which cooperate when the shaft is inserted into the stator to shift the securing element, during radial elongation, onto the shaft and far enough in front of the annular groove to lock into the groove by itself as it continues its axial motion.

2. Description of the Prior Art

A fan with a small motor that has such an axial securing mechanism is known in the art from German Offenlegungsschrift 27 18 428 in which the axial securing mechanism prevents the rotor from falling out axially when running freely suspended. According to the reference, a snap ring is applied on the free end of the shaft and it lies against the inner ring of a ball bearing or, via an additional rotor disk, a friction bearing. An axial stress is exerted on the bearing by means of a spring supported on an additional snap ring. This axial securing means is very expensive to produce and the extent of axial play is not sufficiently precisely determinable. In addition, the service life of the motor is limited due to the unavoidable entry of impurities into the bearing and to the escape of lubricant.

Japanese Utility Model Patent No. 61-72076 (72076/1986) discloses a small motor, in which the axial securing of the shaft involves expensive permanent magnets and a cover protecting the bearing.

The present invention is addressed to an axial securing device, which is particularly suited for a small motor in a fan and which avoids the above shortcomings. Cost-effective production and assembly should also be possible in mass production and precise observance of a specified play should also be assured.

SUMMARY OF THE INVENTION

In the axial securing device according to the invention, the securing element and the recess have contact surfaces which cooperate when the shaft is inserted into the stator to shift the securing element, during radial elongation, onto the shaft and far enough in front of the annular groove to lock into the groove- by itself as it continues its axial motion. The free end of the shaft for applying the securing element does not need to be accessible from the outside; hence, the thrust bearing can be closed and thus assured against fouling and the escape of lubricant. Nevertheless, the assembly is simple because the rotor can be inserted without axial securing, as in a bearing setup. The securing element is brought to the precise position without additional measures. The parameters that determine the axial play can be easily controlled during production, their number is considerably smaller in comparison with the state of the art and the axial securing can also occur at the site of the said rotor disk.

Additional advantages will be evident from the description, drawings and claims.

BRIEF DESCRIPTION OF THE DRAWINGS

Exemplary embodiments of the invention are described in greater detail with reference to the drawings in which.

DETAILED DESCRIPTION OF PREFERRED EMBODIMENTS OF THE INVENTION

Figure 1:
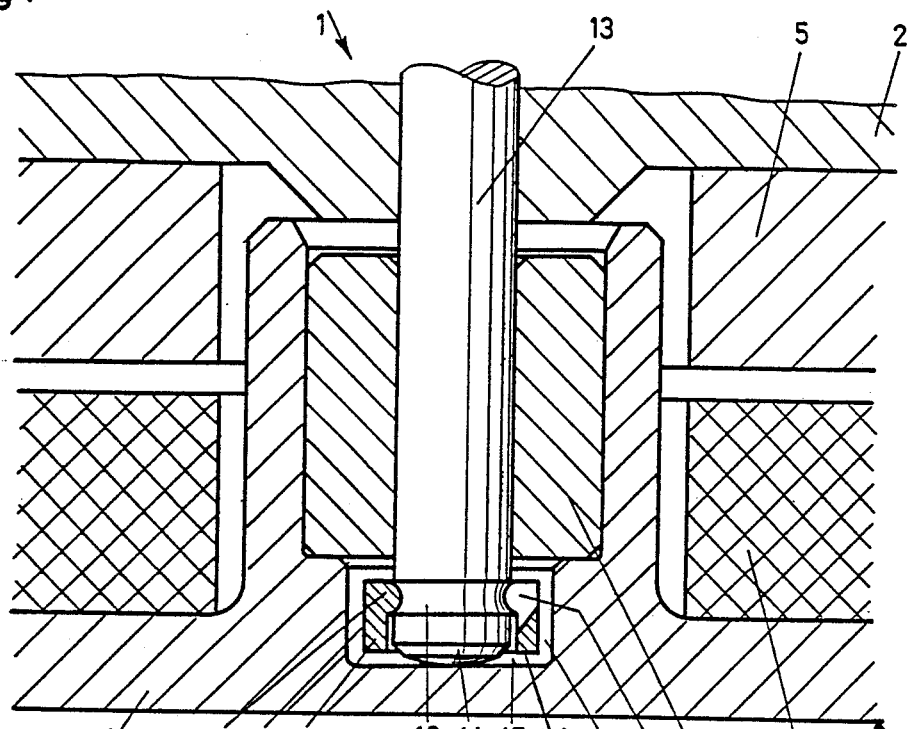
FIG. 1 is a partial section through a stator and a rotor of a disk armature or pancake motor in the region of the rotor shaft in schematic representation and on an enlarged scale.

The disk armature motor, shown schematically in FIG. 1, for a fan has a rotor 2 with permanent magnets 5 and a stator 3 with two field coils 4. A shaft 13 is connected solidly at one end with the rotor 2 and has at the other end a crowned surface 14, which lies during magnetic axial tension on a contact surface 15 of a recess 7 of the stator housing 31. The shaft 13 is rotatably supported in a self-lubricating bushing forming a friction bearing 6 between the ends of the shaft.

Figure 2:
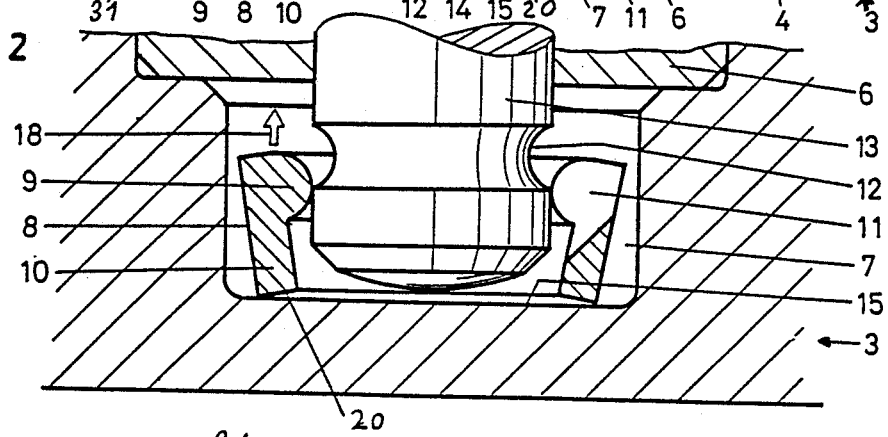
FIG. 2 is a partial section in the region of the thrust bearing.

In order to secure the rotor 2 axially against falling out during suspended operation, a securing element 8 is locked into an annular groove 12 of the shaft 13, as shown in FIG. 2. The securing element has an axial clearance to the friction bearing 6 and otherwise has no sites of contact with the stator 3.

The annular securing element 8 has a bulge 9 directed inwardly, interrupted by one or more radial slots 11, which is snapped into the annular groove 12. A cylindrical projection 10 formed on the bulge 9 is dimensioned so that it is open on its underside, when sliding on the shaft 13, on the surface 15 of the recess 7. This will be better understood by reference to FIG. 2. During assembly the securing element 8 is placed into the recess 7 and then the friction bearing 6 is inserted. The shaft 13 is then inserted into the friction bearing and with slight axial pressure into the securing element 8. The securing element 8 is extended radially, especially in the region of the bulge 9, in which case the projection 10 with its underside surface 20 lies annularly on the surface 15. Shortly before the surface 14 of the shaft encounters the surface 15 of the recess 7, the securing element 8 reaches a position in which it locks into the annular groove 12 due to its tension and is thereby lifted or shifted in the direction of the arrow 18. The securing element 8 is raised far enough so that the surface 20 surrounds the surface 14 of the shaft and the surface 20 lies above the crowned surface 14 of the shaft. If the shaft 13 has reached its end position, the securing element 8 then has given spacings with respect to both the surface 15 and to the friction bearing 6, as shown in FIG. 1. The shaft 13 is thus axially secured and can move axially relative to the stator 3 only to the extent of the available play between the securing element 8 and the friction bearing 6.

For repair purposes, however, the securing element 8 can be again unlocked, in which case the shaft 13 is pulled out of the bearing with a higher tensile force also in the direction of the arrow 18. The securing element 8 remains in the recess 7 and can be again placed on the shaft 13, as previously described.

Figure 3:
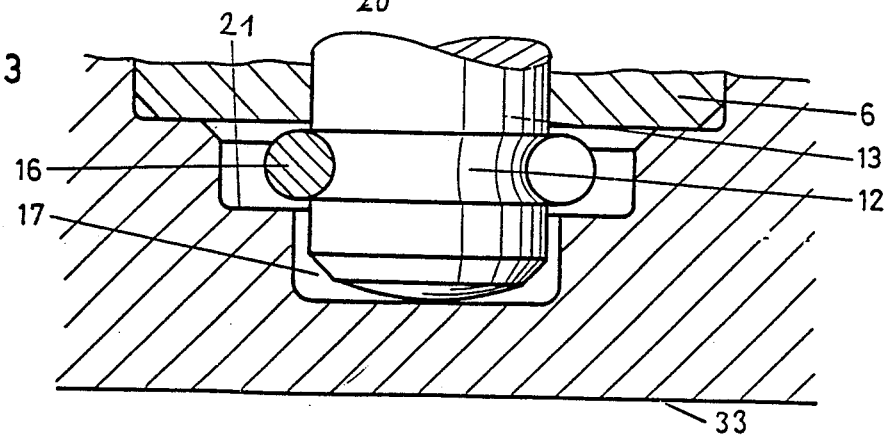
FIG. 3, is a partial section through an additional embodiment of the axial securing device according to the invention.

In the embodiment according to FIG. 3, a securing element 16 in the form of a snap ring or an O-ring is provided, a recess 17 in stator housing 33 has a stepped or raised shoulder surface 21, upon which the securing element 16 lies and causes the securing element to slide or shift on the shaft 13 when the shaft 13 is inverted. The securing element 16 is pushed by the shoulder surface 21 during radial extension in front of the annular groove 12 where it locks into the annular groove 12 when the tension decreases and is lifted in the axial direction.

In addition to the substantial advantages of the axial securing device according to the invention, it can be constructed with a few simple and sturdy components so that it not only facilitates the assembly, but is also cost-effective and extremely reliable operationally due to its simple and sturdy construction.

We claim:

1. An axial securing device for a shaft of a small motor having a stator with coils and a housing wherein one end of the shaft is connected solidly with a rotor, the shaft is supported in a bearing of a stator and a securing element located in a recess in the stator housing is snapped into an annular groove of the shaft for axially securing the shaft, the securing element having an axial clearance to the bearing and no contact sites with the stator, the securing element and the recess having means for shifting the securing element axially on the shaft far enough in front of the annular groove so that the securing element locks into the groove by itself when the shaft is inserted into the recess of the stator housing.

2. An axial securing device according to claim 1, wherein the securing element has a projection that is open when the securing element is shifted onto a bottom surface of the recess.

3. An axial securing device according to claim 2, wherein the projection is a ring coaxial to the shaft.

4. An axial securing device according to claim 1, wherein the securing element has a bulge which is directed inwardly and which locks into the annular groove.

5. An axial securing device according to one of claims 2, 3 or 4, wherein the securing element has radial slots.

6. An axial securing device according to claim 1, wherein the recess includes a stepped shoulder which forms a contact surface for shifting the securing element.

7. An axial securing device according to claim 6, wherein the securing element is a snap ring.

8. An axial securing device according to claim 1, 2, 3, 4, 6 or 7, wherein a bushing is arranged above the recess and forms a friction bearing for the shaft.

* * * * *